P. L. MALTBIE.
Thill-Couplings.

No. 141,655.

Patented August 12, 1873.

Witnesses.
H. L. Perrine
E. R. Brown.

Inventor
Paul L. Maltbie,
by J. C. Threaker
Attorney.

UNITED STATES PATENT OFFICE.

PAUL L. MALTBIE, OF RAMAPO, NEW YORK.

IMPROVEMENT IN THILL-COUPLINGS.

Specification forming part of Letters Patent No. 141,655, dated August 12, 1873; application filed July 25, 1872.

*To all whom it may concern:*

Be it known that I, PAUL L. MALTBIE, of Ramapo, in the county of Rockland and State of New York, have invented a new and useful Improved Thill-Coupling; and I do hereby declare that the following is a full, clear, and exact description thereof, sufficient to enable those skilled in the art to which my invention appertains to make and use the same, reference being had to the accompanying drawing making part of this specification, and to the letters and figures marked thereon.

My invention relates to certain improvements in thill-couplings, whereby increased strength, durability, and effectiveness are secured; and said improvements consist in forming the thill-irons with T-shaped ends, fitting in sockets attached to the axle by clips, said sockets being provided with covers for excluding dust, &c., and with rubber bearings for more firmly holding the irons in place, the thill-irons being set in the sockets in a vertical position, and then lowered to a horizontal position, all as hereinafter particularly set forth.

Figure 1:
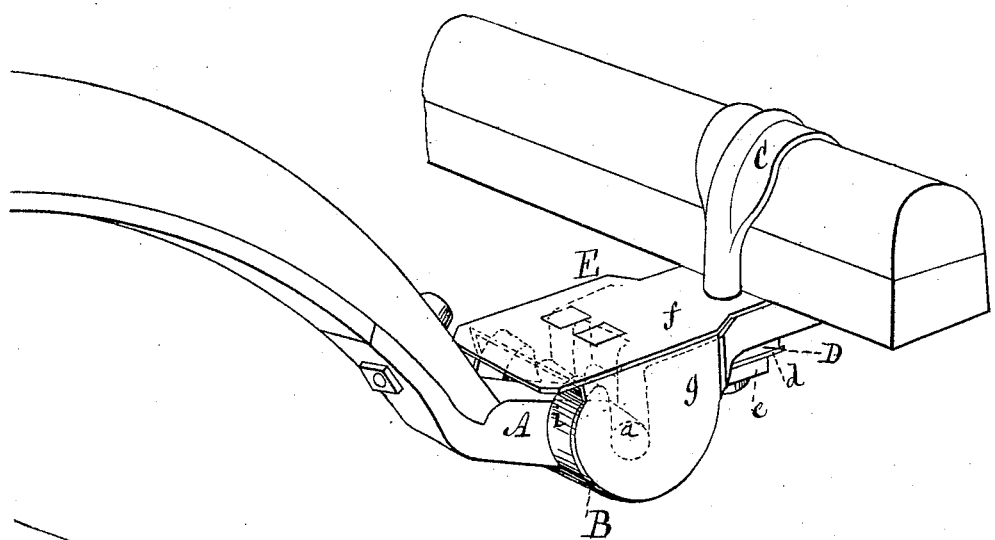
Figure 2:
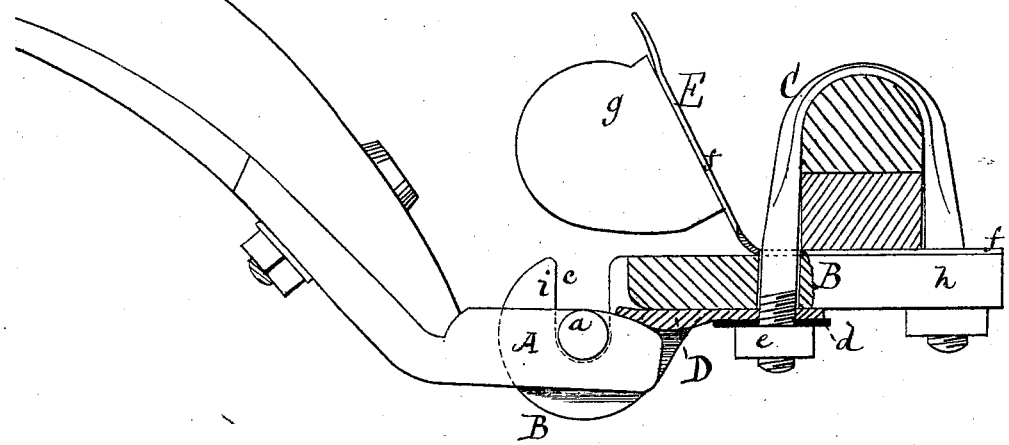

In the accompanying drawing, Figure 1 is a perspective view of my invention; and Fig. 2 is a side elevation, partly in section.

A represents the thill-iron, made with round or other shaped gudgeons $a\ a$, and a tongue, $b$, projecting beyond said gudgeons, forming together a T or cross shaped end on said iron. B is the socket, composed of the flat portion $h$, which is secured to the axle by a clip whose ends pass through it, and provided with downwardly-projecting ears $i\ i$, in which recesses $c\ c$ are made, forming bearings or boxes for the gudgeons $a\ a$ of the thill-iron. D is a piece of elastic substance, preferably India rubber, forming a bearing, against which tongue $b$ abuts, which projects into the socket, as shown in Fig. 2, and is held in place under the flat portion $h$ by the clip C, one end of which passes through it, and by the washer $d$ and nut $e$. The washer serves to render the rubber less yielding, holds it more rigidly in place, and prevents its being chafed by any looseness of nut $e$. E is a cap or cover which fits over the socket, so as to exclude dust, &c., and to allow of readily lubricating the coupling, so as to lessen wear and friction. This cap is composed of a strip of leather, $f$, or other similar material, secured between the axle and coupling by the clip, as shown, and the metal ears or flanges $g\ g$, which may be formed of a single piece of metal, bent as shown, so as to cover the sides of the socket, and riveted or otherwise attached to the leather $f$.

In Fig. 1 this cap or cover is shown in its proper position for protecting the socket, while in Fig. 2 it is raised so as to allow the thill-irons to be removed. The thill-irons can only be placed in and removed from the socket in a vertical position, on account of the tongue $b$. When thus placed in the socket and then lowered to their proper horizontal position, the tongue $b$ presses against the bearing $d$ to prevent the irons from being jolted out of the sockets, and the greater the pressure upon the thills the more firmly are they held in place, and the less noise is made in rattling.

As will be seen in Fig. 2, the rubber bearings fit against the flat part $h$ of the socket, and of course this part ($h$) forms the real resistance to the removal of the irons, yet the rubber acts as a binding medium, whereby the said irons are held in place, and rattling is prevented.

Among the advantages of my invention may be stated, first, it is impossible for the shafts to become detached from the vehicle in any other than a vertical position without injury; second, in attaching or detaching the shafts no wrench or other implement is required; third, as the pressure upon the shafts is increased, so is the security of the coupling, and the less noise is produced; fourth, the cap excludes dust, &c., and allows the coupling to be readily lubricated, thus adding to its durability and lessening wear and friction.

Having thus described my invention, what I claim as new, and desire to secure by Letters Patent, is—

1. The combination of the cap or cover E, composed of a leather or equivalent strip, $f$, and metallic ears $g$, with the socket B, substantially as shown and described.

2. The combination of the thill-irons A, having T or cross shaped ends, with the socket B, bearing D, and cap E, having ears $g$, substantially as shown and described.

PAUL L. MALTBIE.

Witnesses:
 E. E. SAFFERN,
 G. W. SAFFERN.